United States Patent
Frost

[11] Patent Number: 6,089,501
[45] Date of Patent: Jul. 18, 2000

[54] TANDEM-ROTOR GYROPLANE

[76] Inventor: Stanley A. Frost, 4041 SW. Tunnelwood St., Portland, Oreg. 97221

[21] Appl. No.: 09/102,485
[22] Filed: Jun. 22, 1998
[51] Int. Cl.[7] ............................ B64C 27/22; B64C 27/08; B64C 27/52
[52] U.S. Cl. ........................ 244/8; 244/17.11; 244/17.23; 244/17.25
[58] Field of Search .......................... 244/8, 17.11, 17.23, 244/17.25

[56] References Cited

U.S. PATENT DOCUMENTS

| D. 140,480 | 2/1945 | Maycen ................................ 244/17.11 |
|---|---|---|
| 1,838,327 | 12/1931 | Salisbury et al. . |
| 1,961,966 | 6/1934 | Williams ................................ 244/8 |
| 2,074,342 | 3/1937 | Platt ...................................... 244/17.11 |
| 2,330,204 | 9/1943 | Campbell . |
| 2,344,967 | 3/1944 | Bennett . |
| 2,452,726 | 11/1948 | Buchet . |
| 2,488,018 | 11/1949 | Marriage . |
| 2,555,577 | 1/1951 | Daland . |
| 2,571,566 | 10/1951 | Green . |
| 2,579,055 | 12/1951 | Thompson . |
| 2,629,568 | 2/1953 | Croshere, Jr. et al. . |
| 2,675,199 | 4/1954 | Aylor . |
| 2,686,019 | 8/1954 | Shapiro et al. . |
| 2,753,004 | 7/1956 | Jovanovich . |
| 2,755,038 | 7/1956 | Gluhareff ............................. 244/17.25 |
| 3,082,977 | 3/1963 | Arlin . |
| 3,156,434 | 11/1964 | Harrington . |
| 3,181,816 | 5/1965 | Pfleiderer . |
| 3,889,902 | 6/1975 | Madat . |
| 3,894,703 | 7/1975 | Velasquez . |
| 3,905,565 | 9/1975 | Kowley ................................ 244/17.23 |
| 4,008,979 | 2/1977 | Cooper et al. . |
| 4,828,205 | 5/1989 | Durand . |
| 4,913,376 | 4/1990 | Black . |
| 5,727,754 | 3/1998 | Carter, Jr. .................................... 244/8 |

FOREIGN PATENT DOCUMENTS

| 1419169 | 10/1965 | France ................................. 244/17.23 |
|---|---|---|
| 2251473 | 6/1975 | France ..................................... 244/8 |
| 2584996 | 7/1985 | France ................................. 244/17.23 |
| 413069 | 7/1934 | United Kingdom ................ 244/17.11 |
| 1350505 | 4/1974 | United Kingdom ...................... 244/8 |
| 2044622 | 10/1980 | United Kingdom ...................... 244/8 |
| 2152461 | 8/1985 | United Kingdom ...................... 244/8 |
| 2183583 | 6/1987 | United Kingdom ...................... 244/8 |
| WO 94/00343 | 1/1994 | WIPO ...................................... 244/8 |
| WO 98/25820 | 6/1998 | WIPO ...................................... 244/8 |

Primary Examiner—Michael J. Carone
Assistant Examiner—Fredrick T. French, III
Attorney, Agent, or Firm—Robert D. Varitz, PC

[57] ABSTRACT

A tandem-rotor autogiro has a control system that facilitates operation of the tandem-rotor autogiro by fixed-wing aircraft pilots, without the requirement of extensive additional flight training. The autogiro includes forward and rearward non-powered rotors mounted in tandem on the fuselage of the aircraft. The forward rotor is controlled by manipulation of a control stick, and the rearward rotor is controlled by manipulation of foot operated pedals and trim control sticks. In a preferred embodiment the forward rotor is mounted in a plane vertically above a plane of the rearward rotor so as to facilitate an efficient aerodynamic air flow through the rotors.

21 Claims, 8 Drawing Sheets

TANDEM-ROTOR GYROPLANE

1. Field of the Invention

The present invention relates to a tandem-rotor aircraft, and more particularly to a tandem-rotor autogiro having controls that are similar to that of a standard fixed-wing aircraft so as to facilitate operation of the tandem-rotor autogiro by fixed-wing aircraft pilots without the requirement of extensive additional flight training.

2. Background of the Invention

In the field of avionics there are numerous types of aircraft such as fixed-wing aircraft, helicopters and gyroplanes. The most popular type of aircraft is the fixed-wing aircraft due to its fast flying speed and large carrying capacity. Most pilots are initially trained, therefore, to fly fixed-wing aircraft. FIxed-wing aircraft, however, are subject to numerous constraints, such as fast take off and landing speeds, which necessitate long runways. A fixed-wing aircraft typically includes two or more stationary airfoils and a power unit that functions to propel the aircraft in a forward direction. Accordingly, air that is forced rearwardly about the airfoils acts to provide lift and maneuverability to the aircraft.

The lift and maneuverability of a standard fixed-wing aircraft typically are controlled by airfoil control surfaces such as ailerons, an elevator, a rudder, and trim tabs, or combinations thereof. The airfoil controls for the standard fixed-wing aircraft generally include a control stick, rudder pedals and trim tab control knobs. The control stick generally operates the ailerons and elevator. Specifically, port or starboard movement of the control stick causes attendant movement of the ailerons to roll the aircraft in a corresponding port or starboard manner. Forward or rearward movement of the control stick causes attendant movement of the elevators to pitch the nose of the aircraft in a corresponding downward or upward manner. The rudder is controlled by a pair of foot-controlled rudder pedals. Specifically, forward movement of the port rudder pedal causes port movement of the rudder to produce a port yaw of the airplane. Forward movement of the starboard rudder pedal causes starboard movement of the rudder to produce a starboard yaw of the airplane. Manipulation of the elevator trim tab knob and the aileron trim tab knob causes attendant movement, respectively, of the elevator trim tabs and the aileron trim tabs. Movement of the trim tabs further refines adjustment of the control surfaces so that the aircraft will maintain altitude and course without continuous pressure on the main controls.

Rotary-wing aircraft, such as helicopters, are popular because they are highly maneuverable and are capable of vertical lift takeoffs. Helicopters, however, have relatively slow flying speeds, and the flight characteristics of a helicopter are very different from that of a standard fixed-wing aircraft. Accordingly, control of a helicopter requires additional flight training for fixed-wing aircraft pilots who wish to fly a helicopter.

A helicopter typically includes one or more powered rotors to provide lift to the helicopter. The angle of attack of each of the individual blades of a rotor, or the angle of attack of the entire rotor, may be changed during flight to provide the appropriate lift and maneuverability. Specifically, a collective pitch-control stick generally is used to operate the pitch of all of the individual blades of the rotor, to provide vertical maneuvering, whereas a cyclic control stick is used to operate the pitch of individual blades of the rotor as each of the blades moves through the plane of rotation of the rotor, to provide horizontal maneuvering. Heading control pedals are used to control the pitch of the blades of the rear rotor, if present, so as to control the heading of the helicopter.

Gyroplanes, also called autogyros, are popular in that gyroplanes require a relatively short distance for landings due to their low landing speed, allow independent control of fore and aft rotor angles of attack, in multiple rotor craft, and generally are cheaper to manufacture than helicopters. Gyroplanes are also aerodynamically stable. Gyroplanes have roll and pitch stability due to the pendulum effect, and yaw stability generally due to the presence of a vertical stabilizer and rudder. Gyroplanes are aerodynamically similar to fixed-wing aircraft in that gyroplanes include one or more non-powered airfoils, such as rotors, and a power unit that functions to propel the gyroplane in a forward direction. Accordingly, like the fixed-wing aircraft, the lift and maneuverability of the gyroplane is determined by the action of the forward, or downward, speed of the gyroplane, which causes air to pass rearwardly and upwardly around the rotors. The pitch of the rotor may be controlled by tilting the entire rotor hub. In some instances, a cyclic control may be used with the rotor. A collective control is generally not present. Accordingly, control of a gyroplane requires additional flight training for fixed-wing aircraft or helicopter pilots that wish to fly a gyroplane.

SUMMARY OF THE INVENTION

The present invention provides a gyroplane aircraft having a tandem-rotor system, and controls that are similar to that of a standard fixed-wing aircraft so as to facilitate operation of the tandem-rotor autogiro by fixed-wing aircraft pilots without the requirement of extensive additional flight training. The autogiro of the present invention includes forward and rearward non-powered rotors mounted in tandem on the fuselage of the aircraft. In a preferred embodiment the forward rotor is mounted in a plane vertically above a plane of the rearward rotor so as to facilitate an efficient aerodynamic airflow through the rotor system. The fuselage of the gyroplane preferably is manufactured of a size to carry substantial loads, such that the gyroplane may be used in place of long-haul trucks, particularly in areas having poor road conditions.

Each of the non-powered rotors is capable of independent tilting movement with respect to the fuselage in response to movement by the pilot of the aircraft's flight controls. Similar to a fixed-wing aircraft, the flight controls of the present invention preferably includes a control stick, or a yoke, foot pedals and a trim control stick. Forward manipulation of the control stick causes attendant forward tilting movement of the forward rotor with respect to the fuselage, which decreases the lift of the rotor thereby causing the nose of the gyroplane to descend. Rearward manipulation of the control stick causes attendant rearward tilting movement of the forward rotor with respect to the fuselage, which increases the lift of the rotor thereby causing the nose of the gyroplane to ascend. Similarly, tilting of the control stick to one side of the fuselage causes attendant tilting of the forward rotor to that side which tends to yaw the gyroplane in the direction of the rotor tilt. Forward manipulation of the starboard foot pedal causes attendant tilting movement of the rearward rotor toward the port region of the fuselage so as to facilitate a starboard turn of the aircraft. Forward manipulation of the port foot pedal causes attendant tilting movement of the rearward rotor toward the starboard region of the fuselage so as to facilitate a port turn of the aircraft. Manipulation of the trim control stick causes attendant forward or rearward tilting movement of the rearward rotor with respect to the aircraft fuselage. Tilting movement of the rear rotor is used to compensate for variations in the longitudinal location of the center of gravity of the gyroplane so as to trim the aircraft during flight. In other embodiments, the flight controls may include additional trim control sticks, a control wheel, or a "wireless" control system, such as a computerized control console. The controls of the tandem-rotor aircraft of the present invention, from the pilot's perspective, function in much the same way as do the control of a standard fixed-wing aircraft such that a pilot trained to fly a fixed-wing aircraft would easily adapt to operation of the gyroplane of the present invention.

Accordingly, an object of the present invention is to provide a tandem-rotor aircraft that is simple to operate.

Another object of the present invention is to provide a tandem-rotor aircraft that is operable by pilots of standard fixed-wing aircraft without the requirement of extensive additional flight training.

Yet another object of the present invention is to provide a tandem-rotor aircraft wherein each of the tandem-rotors may be independently tilted relative to the body of the aircraft.

Still another object of the present invention is to provide a tandem-rotor aircraft wherein the forward rotor is positioned in a plane vertically above a plane of the rearward rotor.

Another object of the invention is to provide a control mechanism which makes use of the broad center-of-gravity limits of the tandem rotor system of the invention.

A further object of the invention is to provide a control mechanism which makes use of the high level of static and dynamic stability of the tandem rotor system of the invention.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE PREFERRED EMBODIMENTS

Known gyroplanes have been limited to an oddity or toy because of their slow speed and very narrow center-of-gravity limits. Gyroplanes, however, have an important advantage over other aircraft forms in that they can take off and land at very low airspeeds, eliminating the need for long runways which fixed-wing aircraft require, and may still be designed to economically carry a significant payload, unlike helicopters. The use of two rotors, in tandem, on a gyroplane broadens the center-of-gravity limits, enabling the carrying of large, heavy loads and taking off and landing in confined areas, and doing so more economically than a conventional rotary wing aircraft.

Traditional aircraft controls include a stick, or yoke, to control pitch and roll. This is true for fixed wing aircraft, helicopters and single rotor gyroplanes. Likewise, rudder pedal control yaw in all three aircraft types. All three aircraft types have some form of trim control to relieve control pressures during steady state flight. The aircraft and control system of the invention extends conventional appearing control mechanisms to a tandem-rotor gyroplane, and describes how each control input achieves a desired result by affecting the attitude of the two rotors.

Figure 1:
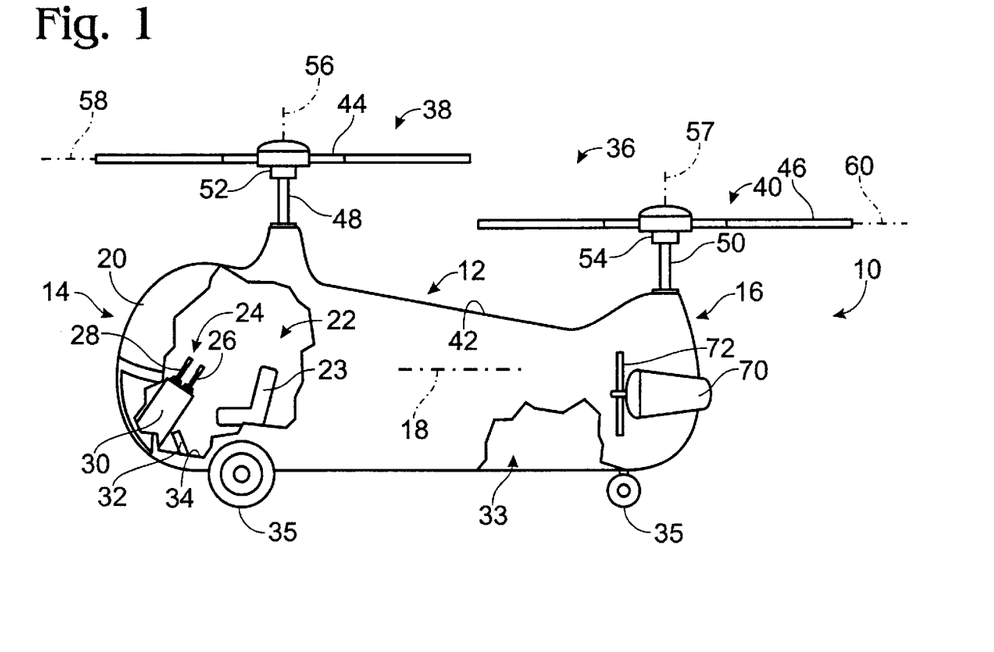
FIG. 1 is a side elevation of the gyroplane of the present invention showing the tandem-rotors, the power unit and the control input device for maneuvering the gyroplane.

Referring initially to FIG. 1, aircraft 10 of the invention typically includes a gyroplane including a fuselage, or body, 12 having a forward region 14, also called the nose or fore region, a rearward region 16, also called the tail or aft region, and a longitudinal axis 18 extending therethrough. Nose region 14 includes a windshield 20 that encloses a cockpit area 22 containing a pilot's seat 23 and a control input device 24. The control input device, also referred to as the flight controls, preferably includes a control stick 26 and trim control sticks 28 and 29, each of which are mounted on a console 30 of the fuselage cockpit, and a pair of foot pedals 32 mounted on a floor 34 of the cockpit. In another embodiment the control stick may include a yoke, a control wheel or any control input device known in the art of fixed-wing flying aircraft and the trim control sticks may include trim control knobs or the like. The fuselage further includes a cargo area 33 positioned rearwardly of cockpit 22 and landing wheels 35 extending from the fore and aft regions of the fuselage. As will be understood by those skilled in the art, the fuselage may be manufactured in any known exterior shape so as to provide the desired aerodynamic and functional cargo requirements of the gyroplane. In a preferred embodiment, the fuselage of the gyroplane is manufactured of a size to carry substantial loads such that the gyroplane may be used instead of long-haul trucks, particularly in areas having poor road conditions.

Aircraft 10 further includes a pair of rotors 36 including a forward rotor 38 and a rearward rotor 40 mounted in tandem on an upper surface 42 of the fuselage. The rotors each include a plurality of individual rotor blades 44 and 46, respectively, mounted to respective rotor shafts 48 and 50 by respective rotor hubs 52 and 54. Rotor shafts 48 and 50 typically are journaled to the fuselage such that their vertical axes 56 and 57, respectively, are positioned substantially vertically when the gyroplane is at rest on level ground. Each of the rotors is capable of independent tilting movement of the rotor hubs about their respective rotor shafts toward the fuselage. The combination of the rotor hub and rotors is also referred to herein as a rotor unit, or as an auto-rotating airfoil. In a level or neutral orientation, wherein the rotors are each positioned perpendicular to vertical axes 56 and 57, respectively, forward rotor 38 defines a plane of rotation 58 that is positioned vertically above a plane of rotation 60 of rearward rotor 40. This vertically staggered orientation of the rotors provides a relatively undisturbed airflow to the rearward rotor that facilitates the aerodynamic efficiency of the aircraft.

Still referring to FIG. 1, aircraft 10 further includes a power system including a power unit 70, such as a gasoline powered engine, which is mounted on the fuselage and which provides power to twin pusher propellers 72 mounted on rear region 16 of the fuselage. Propellers 72 provide forward thrust to the aircraft to achieve the desired airflow over the rotors to lift and maneuver the aircraft. As will be understood by those skilled in the art, any known power system may be used to provide the required lift to the aircraft. For example, the power system may include a forwardly mounted single propeller, a towing device, jet engines or the like. In the preferred embodiment, twin pusher propellers 72 provide a forward thrust to the gyroplane so as to facilitate forward cruising speeds of approximately 150 miles per hour when fully loaded with cargo and fuel. The fore and aft tilt of the fore and aft rotors is determined by the magnitude and direction of travel of the gyroplane relative to the air mass, wherein the direction of travel will generally will be in a forward direction. The travel of the gyroplane, however, due its maneuverability, may be in a sideways direction.

Figure 2:
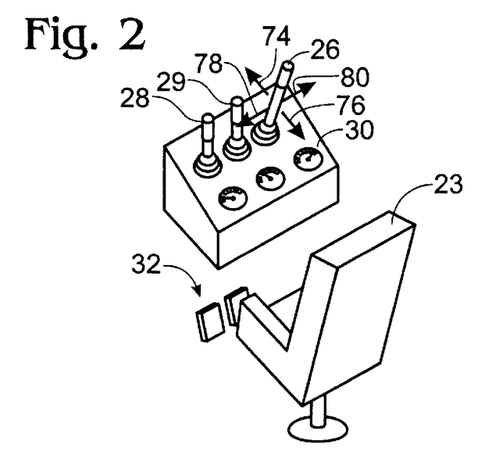
FIG. 2 is detailed perspective view of the control system of FIG. 1.

Referring to FIG. 2, which is detailed perspective view of the control console of FIG. 1, control stick 26 is positioned directly forwardly of pilot's seat 23 and extends outwardly from console 30. Control stick 26 is capable of movement in a forward direction 74, a rearward direction 76, a port direction 78, a starboard direction 80 and in combinations thereof. Movement of the control stick in any of these directions is similar to the movement of a control stick in a standard fixed-wing aircraft such that a pilot trained to fly a standard fixed-wing aircraft would readily recognize the orientation and movement of control stick 26. The control console further includes trim control sticks 28 and 29, which operate to trim the position of the aft and fore rotors, respectively, during flight.

Figure 3:
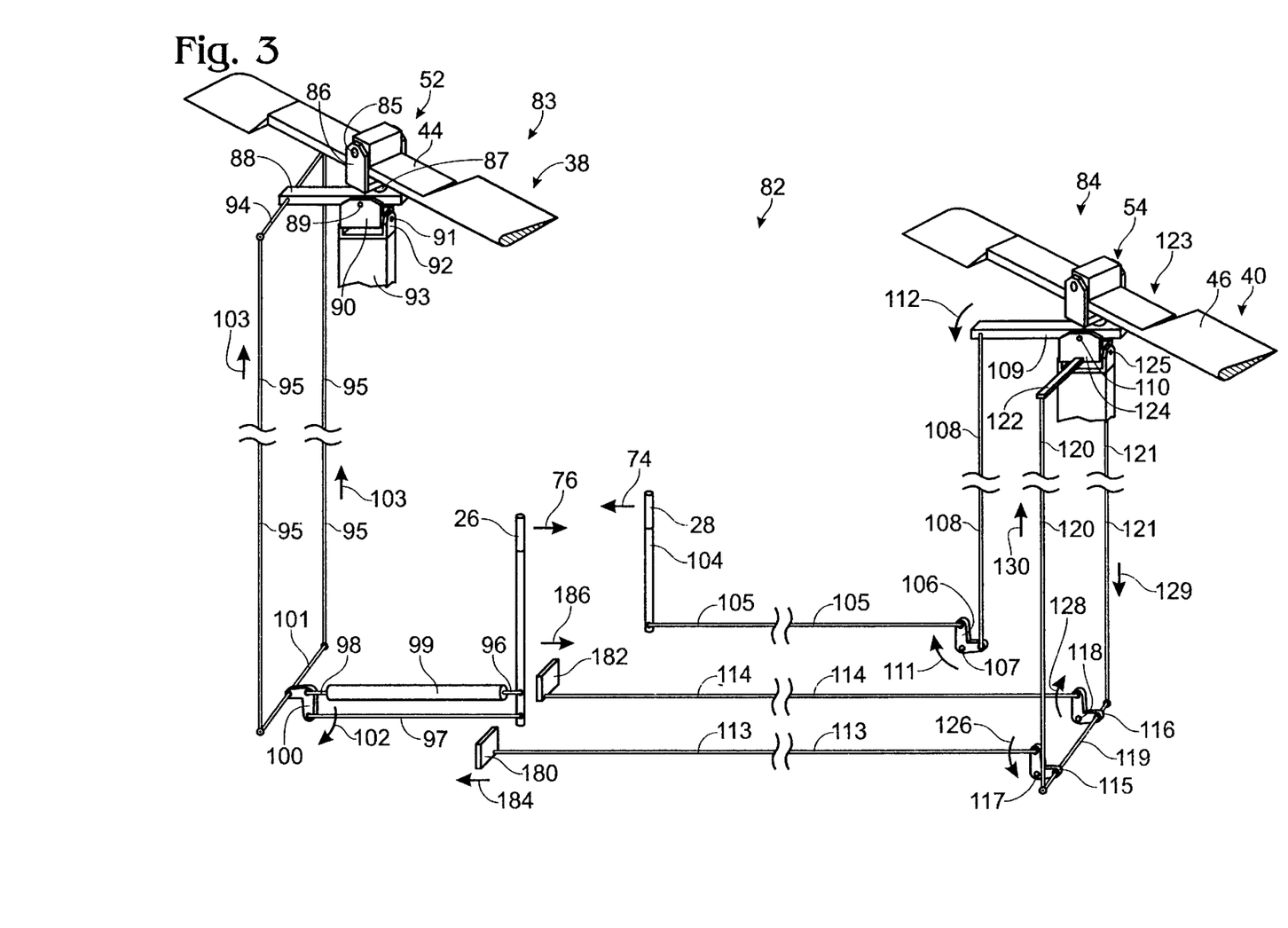
FIG. 3 is a detailed schematic diagram of the mechanics of the control system showing the connection between the rotors and the flight controls.

Referring to FIG. 3, a control system 82 is depicted. FIG. 3 is a detailed view of the mechanics of control system 82, showing the connection between the rotors and the flight controls. Control system 82 includes a fore control system 83 and an aft control system 84 which control, respectively, fore rotor 38 and aft rotor 40. Forward rotor hub 52, which operates in the same manner as rearward rotor hub 54, includes rotor blades 44 which hang from a pin 85 secured within a bracket 86 that rotates on a bearing 87. Bearing 87 is attached to a control arm 88 which pivots on a pin 89 in a bracket 90. Bracket 90 pivots on a pin 91 in a bracket 92 which is attached to a mast 93 secured to the fuselage. Control arm 88 is fixed to a control arm 94 that pivots on control arms 95. Control stick 26 pivots on shafts 96 and 97. Shaft 96 and a shaft 98 rotate in a bearing 99 wherein bearing 99 is fixed to the airframe. An elbow 100 pivots on shafts 97 and 98 wherein elbow 100 is fixed to a control arm 101 that pivots on control arms 95. Accordingly, movement of the handle of control stick 26 rearwardly in direction 76 will cause elbow 100 to rotate in a direction 102 thereby forcing control arms 101 and 95 in an upward direction 103. Upward movement of control arms 95 will cause attendant rotational movement of control arm 88 about pin 89 so as to tilt bearing 87 in rearward direction 76 thereby tilting the rotational axis of rotor blades 44 in a rearward direction. Similarly, forward tilting of control stick 26 in forward direction 74 will result in tilting of the rotational axis of rotor blades 44 in a forward direction. It will be appreciated by those of skill in the art, that although oily two rotor blades are depicted in association with hubs 52 and 54, the hubs may be constructed to accommodate large numbers of rotor blades.

Still referring to FIG. 3, control of rearward rotor hub 5, will be described. Trim control stick 28 pivots on a pin 104 which is secured to the fuselage. The trim control stick is used to establish hands-off control of the gyroplane during flight so as to make slight adjustments during flight for the center of gravity, the load and the power setting of the gyroplane. In another embodiment, trim control stick 28 may include a twist type control stick as is commonly found on motorcycles. Trim control stick 28 pivots a push-pull rod 105 attached to an elbow 106 which pivots on a pin 107 secured to the fuselage. Elbow 106 pivots push-pull rod 108 which pivots a control arm 109 on a pin 110 thus controlling the angle of attack of aft rotor set 40. Accordingly, movement of the handle of trim control stick 28 in forward direction 74 will cause elbow 106 to rotate in a direction 111 about pin 107 so as to move rod 108 downward thereby pivoting control arm 109 in a direction 112 about pin 110 and thereby tilting the rotational axis of rotor blades 46 in a forward direction.

Foot pedals 32 include a port foot pedal 180 and a starboard foot pedal 182 that are fixed to push-pull rods 113 and 114, respectively, which pivot with elbows 115 and 116, respectively. Elbows 115 and 116 are attached to the airframe at pivot pins 117 and 118, respectively, and pivot with a rod 119. Rod 119 pivots with push-pull rods 120 and 121 which pivot, respectively, with control arms 122 and 123 (not shown). Control arms 122 and 123 are fixed to a bracket 124 which pivots on a pin 125 thereby controlling the side to side angle of aft rotor set 40. Foot pedals 180 and 182 are operatively connected so that forward movement of one pedal will cause attendant rearward movement of the other pedal. Accordingly, movement of port foot pedal 180 in a forward direction 184 will cause forward movement of rod 113 thereby rotating elbow 115 in a direction 126. Simultaneous with forward movement of foot pedal 180, foot pedal 182 will move in a rearward direction 186 and will cause rearward movement of rod 114 thereby rotating elbow 116 in a direction 128. Movement of elbow 116 in direction 128, and movement of elbow 115 in direction 126, will cause rod 119 to force rod 121 and control arm 123 to move in a downward direction 129 and will cause rod 120 and control arm 122 to move in an upward direction 130, thereby controlling the side to side angle of aft rotor set 40. Those skilled in the art will understand that blade tilting, in addition to or instead of rotor hub tilting, may be used in the gyroplane of the present invention wherein standard fixed wing controls are used to manipulate the blade tilting so as to facilitate operation of the gyroplane by fixed-wing aircraft pilots without additional extensive training.

In another embodiment, the gyroplane controls of the present invention may be used to control the pitch angle of the individual blades as cyclic pitch control is used in helicopters to control the plane of rotation of the rotor blades.

Figures 4A, 4B, 4C, 4D, 4E:
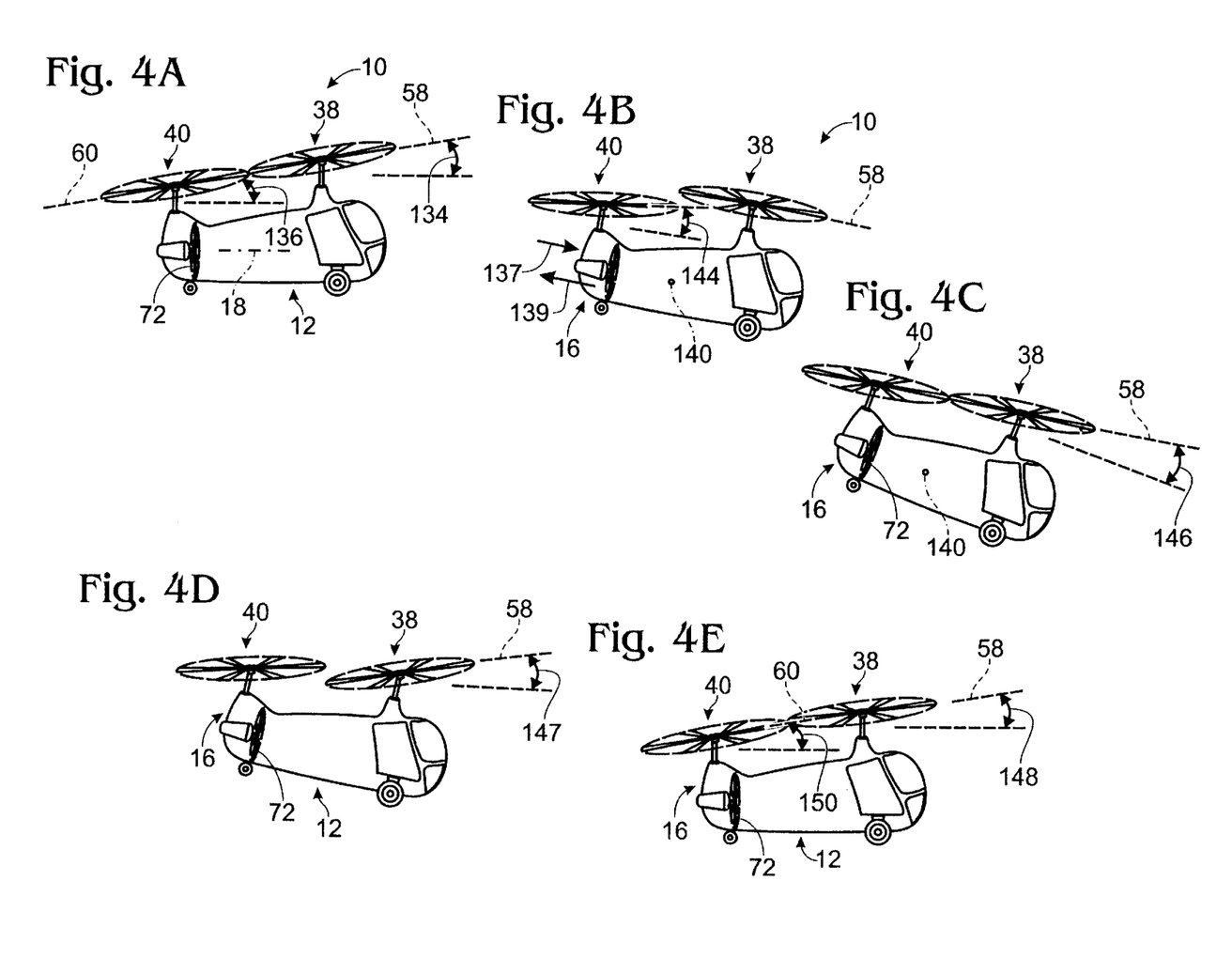
FIGS. 4A–4E are side views showing a descent of the gyroplane due to downward tilting movement of the forward rotor.

Referring to FIGS. 4A–4E, which are side views showing a descent of the gyroplane due to downward tilting movement of the forward rotor, the operation of descent of the gyroplane will be described. FIG. 4A shows gyroplane 10 in a steady state cruise wherein forward rotor 38 is positioned with its plane of rotation 58 at an angle 134 of approximately 10° from a level position (shown by the dash line) with respect to longitudinal axis 18 of the fuselage. Similarly, in this steady state cruise, rearward rotor 40 is positioned with its plane of rotation 60 at an angle 136 of approximately 10° from a level position (shown by the dash line). In this position the rotors are not tilted to either side of the fuselage and the gyroplane experiences level, steady state flight in a forward, horizontal direction 137.

The level position of each of the rotors is defined wherein the plane of rotation of the rotor is parallel to elongate axis 18 of the fuselage and perpendicular to the vertical axis of the corresponding rotor shaft. Accordingly, the angle of the rotors, also called the tilt angle, is defined relative to the fuselage of the gyroplane. As the fuselage is propelled forwardly by propellers 72 in forward direction 137, air impinges on the fuselage and the rotors in a direction 139. The acute angle formed between the plane of rotation of the rotors and the air that impinges on the rotors is defined as the angle of attack of the rotors. Accordingly, the angle of attack of the rotors is defined relative to the airflow through which the gyroplane travels.

FIG. 4B shows gyroplane 10 beginning a descent. Specifically, forward movement of control stick 26 in direction 74 lowers the angle of attack of forward rotor 38. Decreasing the tilt angle of rotor 38 also lessens the angle of attack of the rotor thereby lessening the lift generated by the forward rotor. The decreased lift of the forward rotor downwardly pitches nose 14 of the fuselage about a pitch axis 140 of the fuselage. This downward pitching of fuselage 12 causes the angle of attack 144 of rearward rotor 40 to decrease such that the lift generated by rearward rotor 40 is decreased. In this manner, tail portion 16 of the fuselage also descends thereby tending to facilitate a full descent of the aircraft.

FIG. 4C shows aft movement of control stick 26 in direction 76, which upwardly tilts the forward region of forward rotor 38 to increase its tilt angle to an angle 146 of approximately 10°. This increases the angle of attack of the rotor and the lift generated by the forward rotor to pitch the nose of the aircraft upwardly about pitch axis 140 and to begin to bring the fuselage into a level orientation.

FIG. 4D shows further rearward movement of the control stick to further increase the tilt angle of the forward rotor to an angle 147 of approximately 15. The increase in the tilt angle increases the angle of attack of the rotor, which causes upward movement of the nose of the gyroplane. The upward movement of the nose of the gyroplane causes the angle of attack of rearward rotor 40 to increase such that the lift generated by the rearward rotor is increased. In this manner, tail portion 16 of the fuselage also begins to ascend thereby tending to facilitate a leveling of the aircraft.

FIG. 4E shows forward movement of control stick 26 in direction 74, which downwardly tilts the forward region of forward rotor 38 to decrease its tilt angle to an angle 148 of approximately 10°. This decreases the lift generated by the forward rotor to bring the fuselage into a level orientation. Accordingly, gyroplane 10 is returned to a steady state cruise wherein forward rotor 38 is positioned with its plane of rotation 58 at the steady state cruise angle of approximately 10° from a level position. Similarly, in this steady state cruise, rearward rotor 40 is positioned with its plane of rotation 60 at an angle 150 of approximately 10 from a level position. During the descent process thus described, the tilt angle of the rear rotor is not changed. The angle of attack of the rear rotor, however, is changed due to the pitching movement of the fuselage about its pitching axis. Those skilled in the art will understand that other angles may also be utilized during a descent of the aircraft. Angles less than 30° are preferred during high power thrust of the gyroplane but angles larger than 30° may also be used during lower power thrust of the gyroplane.

Figure 5A:
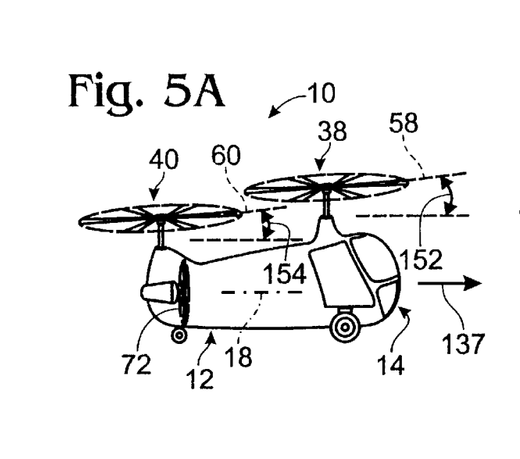
FIGS. 5A–5E are side views showing an ascent of the gyroplane due to upward tilting movement of the forward rotor.

Referring to FIGS. 5A–5E, which are side views showing an ascent of the gyroplane due to upward tilting movement of the forward rotor, the operation of ascending the gyroplane will be described. FIG. 5A shows gyroplane 10 in a steady stale cruise wherein forward rotor 38 is positioned with its plane of rotation 58 at an angle 152 of approximately 10° from a level position (shown by the dash line) with respect to longitudinal axis 18 of the fuselage. Similarly, in this steady state cruise, rearward rotor 40 is positioned with its plane of rotation 60 at an angle 154 of approximately 10° from a level position (shown by the (lash line). In this position the rotors are not tilted to either side of the fuselage and the gyroplane experiences level, steady state flight in forward, horizontal direction 137. As will be understood by one skilled in the art, the load, the center of gravity, and the power setting of the gyroplane may result in hands-off flight positioning of the longitudinal axis of the gyroplane fuselage at a pitched angle with respect to the horizon during steady state flight.

Figure 5B:
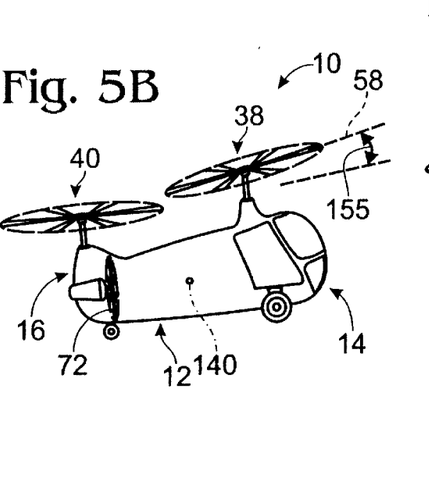

FIG. 5B shows gyroplane 10 beginning an ascent. Specifically, rearward movement of control stick 26 in direction 76 tilts upward the forward region of forward rotor 38 to raise its tilt angle to an angle 155 of approximately 20°. Increasing the tilt angle of rotor 38 also increases the angle of attack of the rotor thereby increasing the lift generated by the forward rotor. The increased lift of the forward rotor upwardly pitches nose 14 of the fuselage about pitch axis 140 of the fuselage. This upward pitching of fuselage 12 causes the angle of attack of rearward rotor 40 to increase such that the lift generated by rearward rotor 40 is increased. In this manner, tail portion 16 of the fuselage also ascends thereby tending to facilitate a full ascent of the aircraft so long as the airspeed of the aircraft is maintained.

Figure 5C:
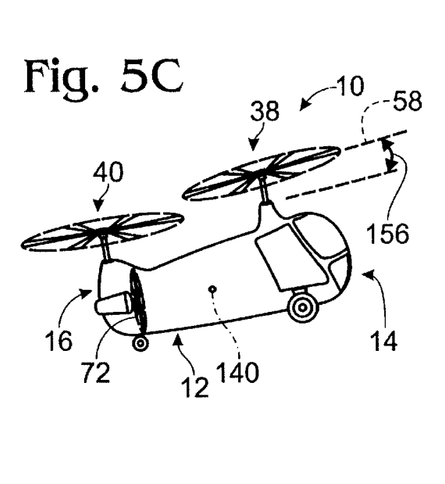

FIG. 5C shows forward movement of control stick 26 in direction 74, which downwardly tilts the forward region of forward rotor 38 to decrease its tilt angle to an angle 156 of approximately 10°. This decreases the angle of attack of the rotor and the lift generated by the forward rotor to pitch the nose of the aircraft downwardly about pitch axis 140 and to begin to bring the fuselage into a level orientation.

Figure 5D:
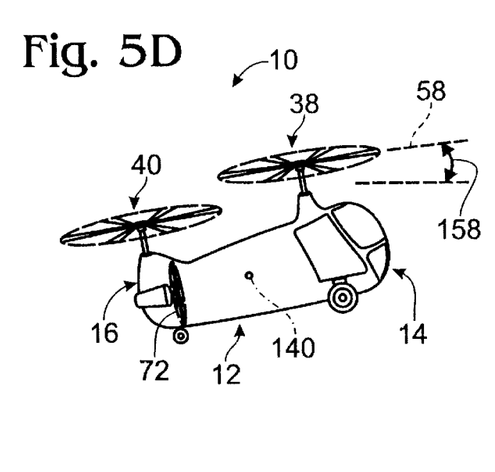

FIG. 5D shows further forward movement of the control stick to further decrease the tilt angle of the forward rotor to an angle 158 of approximately 5°. The decrease in the tilt angle decreases the angle of attack of the rotor, which causes downward movement of the nose of the gyroplane. The downward movement of the nose of the gyroplane causes the angle of attack of rearward rotor 40 to decrease such that the lift generated by the rearward rotor is decreased. In this manner, tail portion 16 of the fuselage also stops climbing, thereby tending to facilitate a leveling of the aircraft.

Figure 5E:
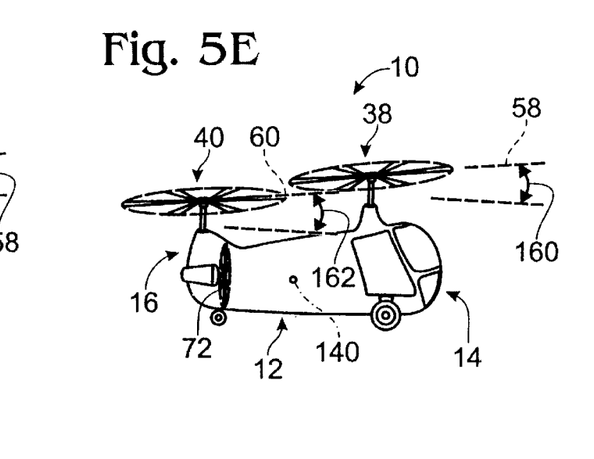

FIG. 5E shows rearward movement of control stick 26 in direction 76, which upwardly tilts the forward region of forward rotor 38 to increase its tilt angle to an angle 160 of approximately 10°. This increases the lift generated by the forward rotor to bring the fuselage into a level orientation.

Accordingly, gyroplane 10 is returned to a steady state cruise wherein forward rotor 38 is positioned with its plane of rotation 58 at the steady state cruise angle of approximately 10° from a level position. Similarly, in this steady state cruise, rearward rotor 40 is positioned with its plane of rotation 60 at an angle 162 of approximately 10° from a level position. During the ascent process thus described, the tilt angle of the rear rotor is not changed. The angle of attack of the rear rotor, however, is changed due to the pitching movement of the fuselage about its pitching axis. Those skilled in the art will understand that other angles may also be utilized during the ascent procedure of the aircraft.

Figure 6A:
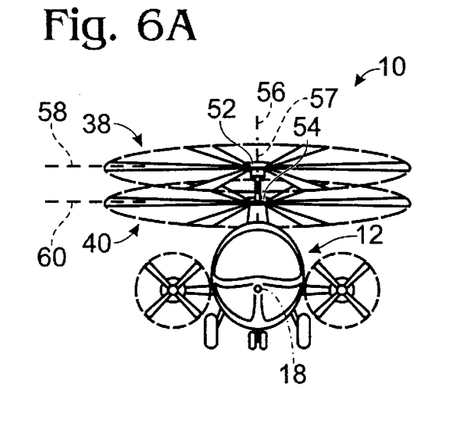
FIGS. 6A–6D are front views showing a port turn of the gyroplane due to port tilting movement of the forward rotor.

Referring to FIGS. 6A–6D, which are front views showing a port turn of the gyroplane due to port tilting movement of the forward rotor, turning of the gyroplane will be described. FIG. 6A shows gyroplane 10 in a steady state cruise wherein rotors 38 and 40 are in a cruising position such that the planes of rotation 58 and 60 of the rotors are positioned generally at a forward angle of approximately 10° to longitudinal axis 18 and such that the rotors are not tilted to either side of the fuselage. In this position the rotors do not impart a turning force to fuselage 12 such that the longitudinal axis 18 of the fuselage is aligned with the direction of travel of the gyroplane.

Figure 6B:
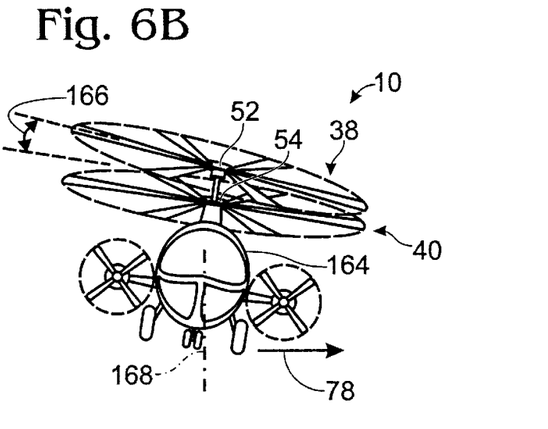

FIG. 6B shows movement of the control stick in direction 78 to port side 164 of fuselage 12 which causes attendant tilting of forward rotor 38 to the port side of the fuselage. The forward rotor is shown tilted at a tilt angle 166 of approximately 10° from its neutral position. This tilting movement of the forward rotor results in a force to yaw the aircraft in port direction 78 about a central vertical axis 168 of the fuselage. The yawing force is equal to the lift multiplied by the sine of the tilt angle. Those skilled in the art will understand that central vertical axis 168 is generally aligned with the center of gravity along the longitudinal axis of the fuselage which may vary according to loads held within the fuselage and with the positioning and manipulation of the rotors.

Figure 6C:
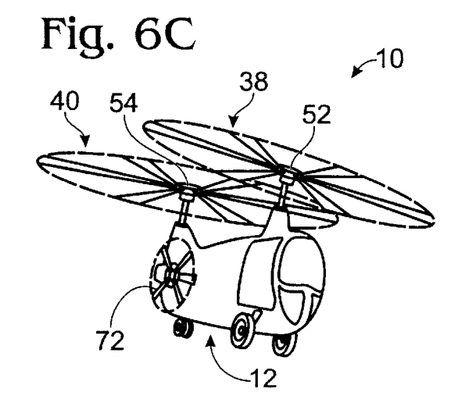

FIG. 6C shows banking movement of the aircraft fuselage due to the centrifugal force resulting from turning of the aircraft. This centrifugal force is due to the pendulum effect of the fuselage, which is suspended from rotor hubs 52 and 54. The pitch axis and the yaw axis of the gyroplane typically are located between the fore and aft rotors. The exact positioning of the pitch axis and the yaw axis of the gyroplane depends, however, on the exact control mechanism used as well as the load, center of gravity, and positioning and setting of the power system.

Figure 6D:
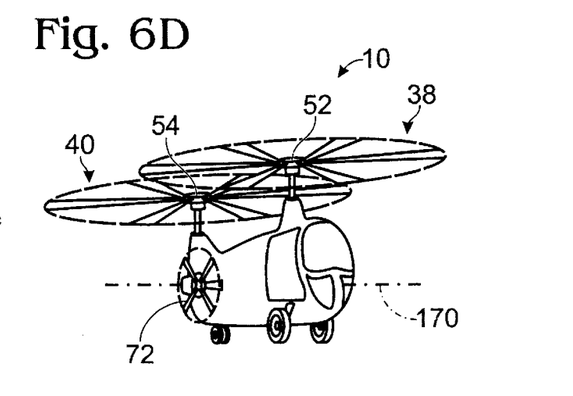

FIG. 6D shows return of the control stick to a neutral position to return forward rotor 38 to an un-tilted position. Return of the forward rotor to the neutral position removes the yawing force on the fuselage so that the aircraft will maintain its new heading in a direction 170. Those skilled in the art will understand that tilting the rotor in a starboard direction will result in a turning force to move the aircraft in a corresponding starboard direction. Those skilled in the art will also understand that other angles may be utilized during the turning procedure of the aircraft.

Figure 7:
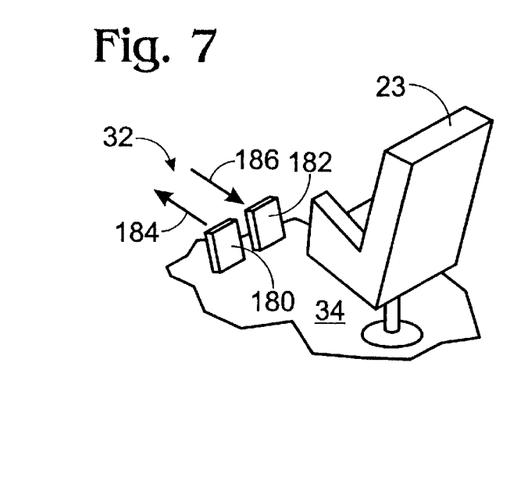
FIG. 7 is a detailed perspective view of the foot pedals of FIG. 1.

Referring to FIG. 7, which is a detailed perspective view of the foot pedals of FIG. 1, pair of foot pedals 32 includes port side foot pedal 180 and starboard side foot pedal 182. The foot pedals are positioned directly forwardly of pilot's seat 23 and extend upwardly from floor 34 of the fuselage. Each of the foot pedals is capable of movement in a forward direction 184 and a rearward direction 186, respectively. Movement of one of the foot pedals in the forward direction is similar to the movement of one of the foot pedals in a standard fixed-wing aircraft such that a pilot trained to fly a standard fixed-wing aircraft would readily recognize the orientation and movement of foot pedals 180 and 182.

Figure 8A:
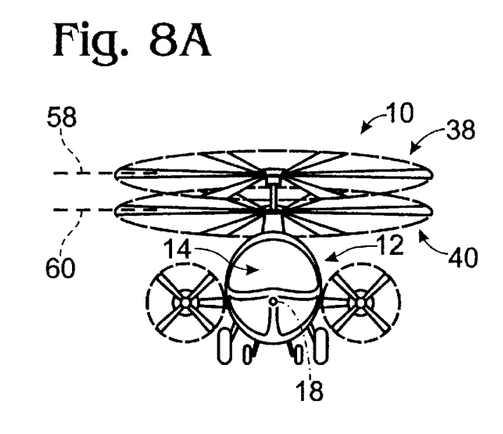
FIGS. 8A–8D are side views showing a port yaw of the gyroplane due to starboard tilting movement of the rearward rotor.

Referring to FIGS. 8A–8D, which are side views showing a port yaw of the gyroplane due to starboard tilting movement of the rearward rotor, turning of the gyroplane will be described. FIG. 8A shows gyroplane 10 in a steady state cruise wherein rotors 38 and 40 are in a cruising position such that planes of rotation 58 and 60 of the rotors are each positioned generally at an angle of approximately 10° to longitudinal axis 18, and such that the rotors are not tilted to either side of the fuselage. In this position the rotors do not impart a yawing force to fuselage 12 so that longitudinal axis 18 of the fuselage is aligned with the direction of travel of the gyroplane.

Figure 8B:
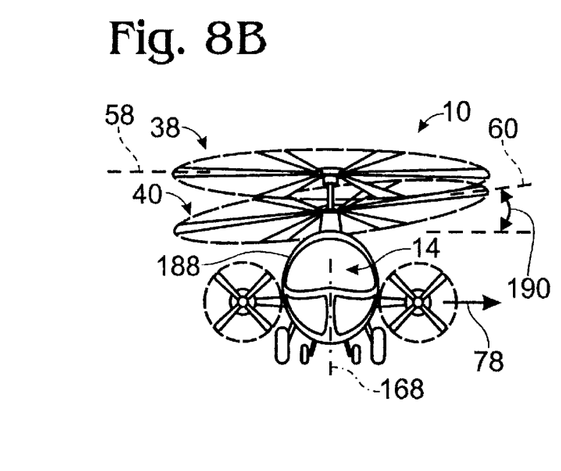

FIG. 8B shows forward movement of port side foot pedal 180 in direction 184, which causes attendant tilting of rearward rotor 40 toward a starboard side 188 of the fuselage. The rearward rotor is shown tilted at an angle 190 of approximately 10° from its neutral position. Those skilled in the art will understand that other angles may be utilized during the turning procedure of the aircraft. This tilting movement of the aft rotor results in a force to yaw the aircraft in port direction 78 about central vertical axis 168 of the fuselage. The yawing force is equal to the lift multiplied by the sine of the tilt angle. Those skilled in the art will also understand that central vertical axis 168 is generally aligned with the center of gravity of the fuselage which may vary along the longitudinal axis of the fuselage according to loads held within the fuselage and with the positioning and manipulation of the rotors.

Figure 8C:
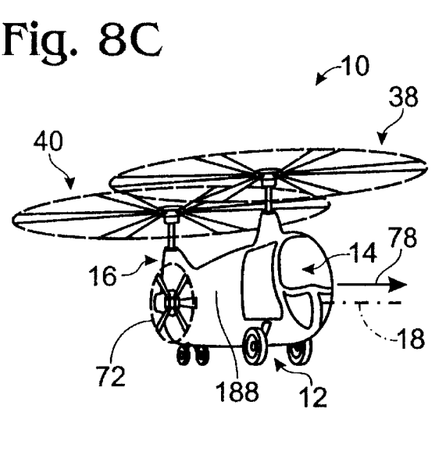

FIG. 8C shows the turning movement of the aircraft fuselage due to the yawing force resulting from tilting of the aft rotor. Specifically, nose 14 of the fuselage is moved in port direction 78 due to the forward movement of port foot pedal 180.

Figure 8D:
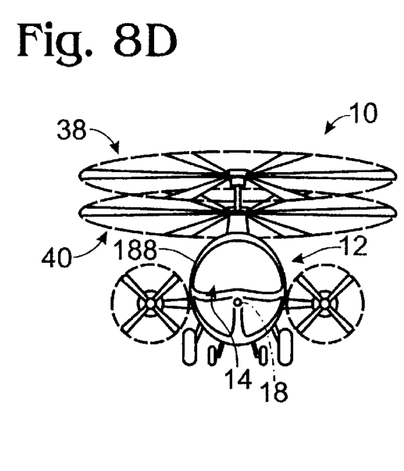

FIG. 8D shows return of the port foot pedal to a neutral position, such as by a spring force acting on the pedal, upon the release of pressure from the pedal. Returning the port foot pedal to the neutral position returns aft rotor 40 to an un-tilted position thereby removing the yawing force on the fuselage of the aircraft. In the turned orientation starboard side 188 of the fuselage is exposed to air that moves rearwardly past the fuselage as the aircraft is propelled forwardly. The large side area of the aircraft functions as a vertical stabilizer to return the aircraft to a nose first attitude such that longitudinal axis 18 is aligned with the direction of travel. In another embodiment, a vertical stabilizer may be added to the tail region of the fuselage so as to return the aircraft to a nose first attitude. Those skilled in the art will understand that depressing the starboard foot pedal in the forward direction will result in a yawing force to move the aircraft in a corresponding starboard direction. Steering of the gyroplane by use of the foot pedals is feasible due to the low speeds at which the gyroplane may be operated.

Figure 9:
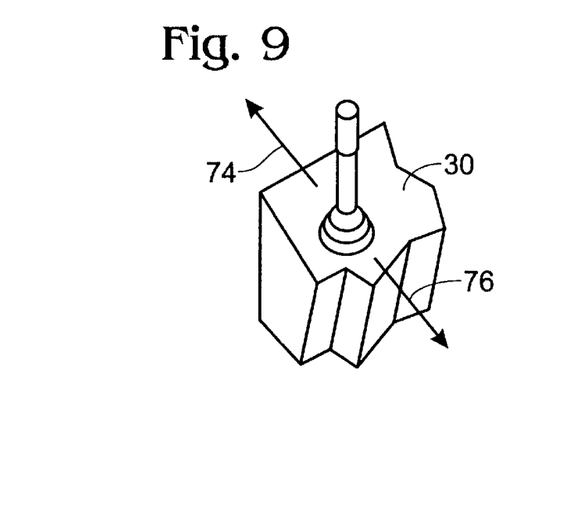
FIG. 9 is a detailed perspective view of the trim control stick of FIG. 1.

Referring to FIG. 9, which is a detailed perspective view of the trim control stick of FIG. 1, trim control stick 28 is capable of movement in forward direction 74 and in rearward direction 76. Manipulation of the trim control stick in directions 74 and 76 causes attendant forward and rearward tilting of the rearward rotor, respectively, with respect to the aircraft fuselage so as to trim the aircraft during flight. In a similar manner, trim control stick 29 trims the position of the forward rotor. In the preferred embodiment, trim control stick 29 is a joystick that may by manipulated in forward, rearward, and sideways directions so as to correspondingly trim the forward rotor set.

Figure 10A:
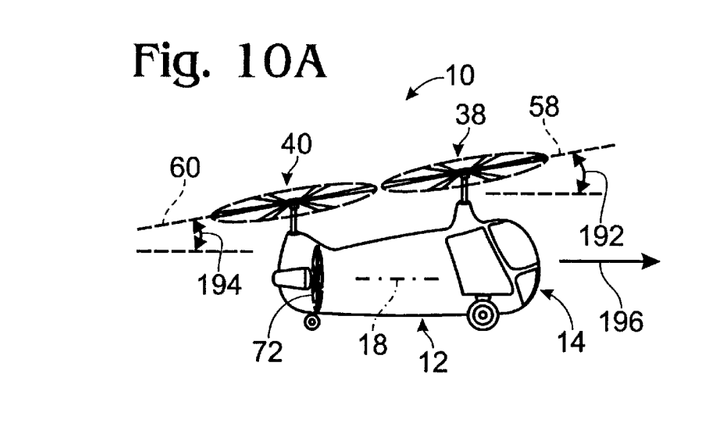
FIGS. 10A–10C are side views showing trimming of the gyroplane due to upward tilting movement of the forward rotor and downward tilting movement of the rearward rotor.
Figure 10B:
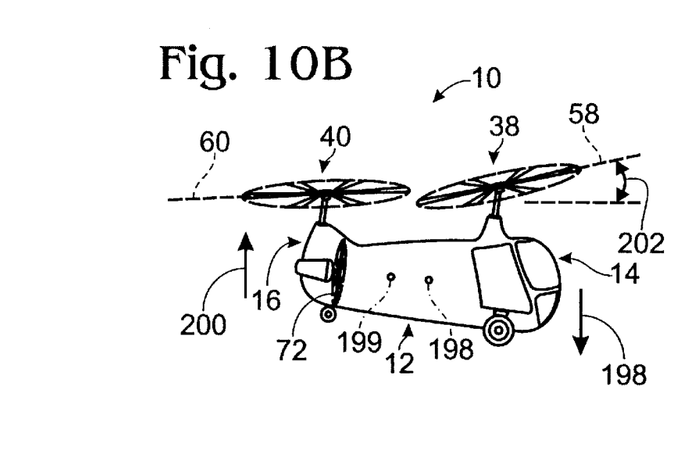
Figure 10C:
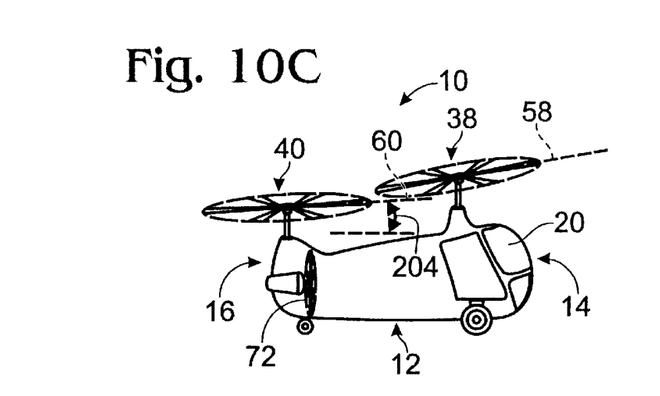

Referring to FIGS. 10A–10C, which are side views showing trimming of the gyroplane due to upward tilting movement of the forward rotor and downward tilting movement of the rearward rotor, trimming of the gyroplane will be described. Specifically, slight changes in the tilt angle of the rotors are affected by trim control sticks 28 and 29 such that slight changes in the lift of the rotors, as determined by the angle of attack of each rotor, are used to compensate for variations in the location of the longitudinal center of gravity of the aircraft. FIG. 10A shows gyroplane 10 in a steady state cruise wherein rotors 38 and 40 are in a cruising orientation such that planes of rotation 58 and 60 of the rotors are positioned generally at an angle 192 and 194, respectively, of approximately 10° to longitudinal axis 18 and such that the rotors are not tilted to either side of the fuselage. In this position the rotors do not impart a pitching or a yawing force to fuselage 12 so that the longitudinal axis 18 of the fuselage is aligned with direction of travel 196 of the gyroplane.

FIG. 10B depicts a situation where forward displacement of the longitudinal center of gravity 198 of the aircraft, possibly resulting from cargo loading or fuel burn-off, from a first position 199. This forward displacement results in nose 14 of the aircraft lowering in a direction 198 and tail 16 of the aircraft raising in a direction 200. The tail of the aircraft raises enough to decrease the angle of attack of the rearward rotor to equal the de creased load the aft rotor must lift. In this situation, the pilot maintains the altitude of the aircraft by moving fore rotor trim control stick 29 in rearward direction 76 to increase the tilt angle of the forward rotor to an angle 202 of approximately 17° so as to increase the angle of attack on the forward rotor. This increase in the angle of attack of the forward rotor acts to carry the increased load on the forward rotor due to the forward shifting of the longitudinal center of gravity of the aircraft.

FIG. 10C shows trimming of the aircraft while maintaining altitude by decreasing the tilt angle of the aft rotor. The tilt angle of the aft rotor is decreased to an angle 204 of approximately 8 by forward movement of aft rotor trim control stick 28 in direction 74. Decreasing the tilt angle of the aft rotor decreases the angle of attack of the rearward rotor so as to level the aircraft. The increase or decrease in the tilt angle of either of the rotors can be on the order of 1° to achieve the desired trimming of the aircraft when the longitudinal center of gravity of the aircraft is moved forwardly or rearwardly within the aircraft.

Figure 11:
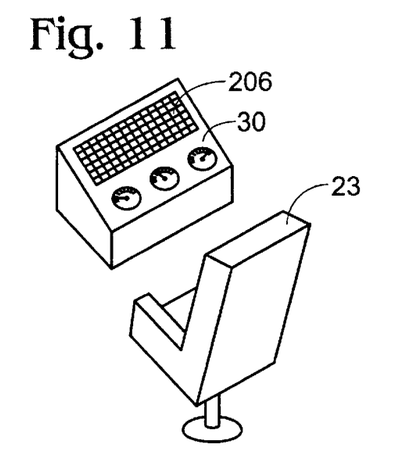
FIG. 11 is a detailed perspective view of another embodiment of the flight controls of the gyroplane of the present invention.

Referring to FIG. 11, which is a detailed perspective view of another embodiment of the flight controls of the gyroplane of the present invention, the flight controls may include a "wireless" flight control system, similar to the wireless flight control system of a standard fixed-wing aircraft, wherein the pilot inputs the desired pitch, roll and yaw characteristics to an onboard computer system via a touch activated control console 206. The preferred embodiment of the gyroplane of the present invention, however, uses the fly-by-wire system as described, due to its low mechanical failure rate.

Figure 12:
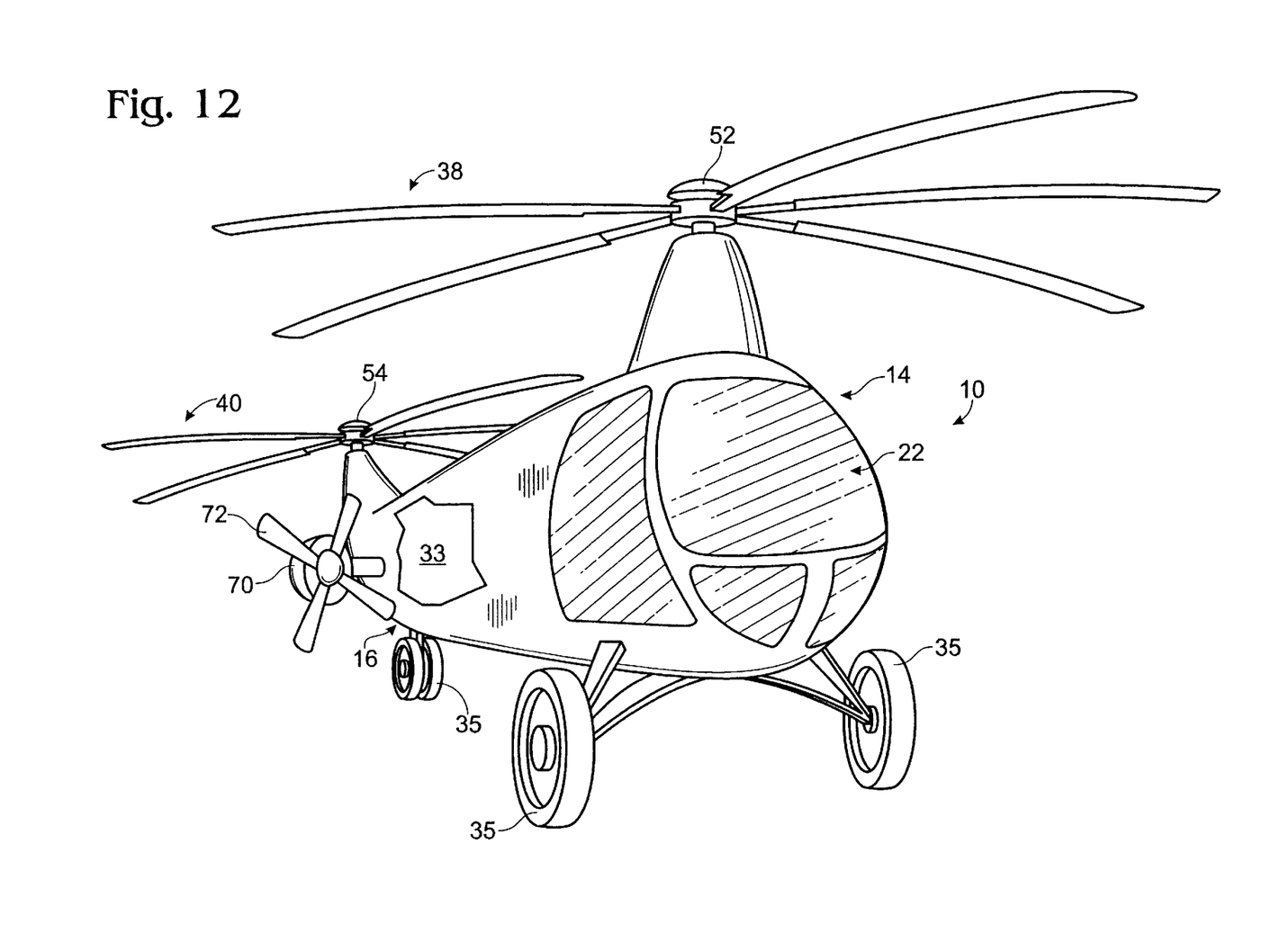
FIG. 12 is a perspective view of a preferred embodiment of the gyroplane of the present invention.

FIG. 12 is a perspective view of a preferred embodiment of the gyroplane of the present invention showing the external shape of the fuselage of the gyroplane and externally mounted power units 70.

While preferred embodiments of the present invention have been shown and described, it will be apparent to those skilled in the art that many further variations and modifications may be made without departing from the scope of the invention as defined in the appended claims, which are intended to cover all such changes and modifications as fall within the scope of the invention.

I claim:

1. An autogiro comprising:
   a fuselage having forward, rearward, port and starboard regions;
   a power unit capable of propelling said fuselage;
   forward and rearward non-powered rotor units mounted in tandem on said fuselage, each rotor unit being capable of tilting movement with respect to said fuselage in any selected
   a first control input device operatively connected to said forward rotor unit wherein manipulation of said first control input device causes tilting movement of said forward rotor unit in any selected azimuth with respect to said fuselage.

2. The autogiro of claim 1 wherein said first control input device comprises a control stick mounted within said fuselage and wherein forward manipulation of said control stick causes attendant forward tilting movement of said forward rotor unit with respect to said fuselage and wherein rearward manipulation of said control stick causes attendant rearward tilting movement of said forward rotor unit with respect to said fuselage.

3. The autogiro of claim 1 wherein said first control input device comprises a control stick mounted within said fuselage and wherein manipulation of said control stick toward the port region of the fuselage causes attendant tilting movement of said forward rotor unit toward the port region of the fuselage and wherein manipulation of said control stick toward the starboard region of the fuselage causes attendant tilting movement of said forward rotor unit toward the starboard region of the fuselage.

4. The autogiro of claim 1 further comprising a second control input device operatively connected to said rearward rotor unit wherein manipulation of said second control input device causes corresponding port and starboard tilting movement of said rearward rotor unit with respect to said fuselage.

5. The autogiro of claim 4 wherein said second control input device comprises first and second pedals mounted within said fuselage and wherein forward manipulation of said first pedal causes attendant tilting movement of said rearward rotor unit toward the port region of the fuselage and wherein forward manipulation of said second pedal causes attendant tilting movement of said rearward rotor unit toward the starboard region of the fuselage.

6. The autogiro of claim 1 further comprising a third control input device operatively connected to said rearward rotor unit wherein manipulation of said second control input device causes forward and rearward tilting movement of said rearward rotor unit with respect to said fuselage.

7. The autogiro of claim 6 wherein said third control input device comprises a trim control mounted within said fuselage.

8. An autogiro comprising:
   an aircraft body;
   a power unit capable of propelling said aircraft body;
   fore and aft auto-rotating airfoils mounted on said aircraft body and being capable of tilting movement with respect to said aircraft body in any selected azimuth; and
   a control input device capable of causing tilting movement of said aft auto-rotating airfoil in any selected azimuth with respect to said aircraft body so as to maneuver said aircraft body during flight.

9. The autogiro of claim 8 wherein said control input device comprises first and second pedals mounted within said aircraft body and wherein forward manipulation of said first pedal causes port tilting movement of said aft airfoil with respect to the aircraft body and wherein forward manipulation of said second pedal causes starboard tilting movement of said aft airfoil with respect to the aircraft body.

10. The autogiro of claim 9 wherein said control input device further comprises a control stick mounted within said aircraft body and wherein forward or rearward manipulation of said control stick causes attendant forward or rearward tilting movement of said fore airfoil with respect to said aircraft body.

11. The autogiro of claim 10 wherein said control stick is mounted within said aircraft body and wherein port or starboard manipulation of said control stick causes attendant port or starboard tilting movement of said fore airfoil with respect to the aircraft body.

12. The autogiro of claim 11 wherein said control input device further comprises a trim control mounted within said aircraft body and wherein manipulation of said trim control causes forward and rearward tilting movement of said aft airfoil with respect to said aircraft body.

13. An autogiro comprising:

an aircraft body;

a power unit capable of propelling said aircraft body;

first and second non-powered rotors mounted on said aircraft body and being capable of independently controlled tilting movement in any selected azimuth with respect to said aircraft body wherein the first rotor is mounted on the aircraft body forward of the second rotor.

14. The autogiro of claim 13 further comprising a control input device including a control stick and foot pedals, said control input device being capable of causing independent tilting movement of said first and second non-powered rotors with respect to said aircraft body so as to control the movement of said aircraft body during flight.

15. The autogiro of claim 14 wherein said control stick is mounted within said aircraft body and wherein forward or rearward manipulation of said control stick causes attendant forward or rearward tilting movement of said first rotor with respect to said aircraft body.

16. The autogiro of claim 14 wherein said control stick is mounted within said aircraft body and wherein port or starboard manipulation of said control stick causes attendant port or starboard tilting movement of said first rotor with respect to the aircraft body.

17. The autogiro of claim 14 wherein said foot pedals comprise first and second pedals mounted within said aircraft body and where in forward manipulation of said first pedal causes port tilting movement of said second rotor with respect to the aircraft body and wherein forward manipulation of said second pedal causes starboard tilting movement of said second rotor with respect to the aircraft body.

18. The autogiro of claim 14 wherein said control input device further includes a trim control mounted within said aircraft body and wherein manipulation of said trim control causes forward and rearward tilting movement of said second rotor with respect to said aircraft body.

19. An autogiro comprising:

a fuselage having forward, rearward, port and starboard regions;

a power unit capable of propelling said fuselage;

forward and rearward non-powered rotor units mounted in tandem on said fuselage, each rotor unit being capable of tilting movement in any selected azimuth with respect to said fuselage; and a conventional rotary wing aircraft control system operatively connected to said non-powered rotor units; said control system including:

a control stick mounted within said fuselage and wherein forward manipulation of said control stick causes attendant forward tilting movement of said forward rotor unit with respect to said fuselage and wherein rearward manipulation of said control stick causes attendant rearward tilting movement of said forward rotor unit with respect to said fuselage; and wherein manipulation of said control stick toward the port region of the fuselage causes attendant tilting movement of said forward rotor unit toward the port region of the fuselage and wherein manipulation of said control stick toward the starboard region of the fuselage causes attendant tilting movement of said forward rotor unit toward the starboard region of the fuselage;

wherein said control system is operatively connected to said rearward rotor unit wherein manipulation of said conventional rotary wing aircraft control system causes corresponding port and starboard tilting movement of said rearward rotor unit with respect to said fuselage, and said control system includes first and second pedals mounted within said fuselage and wherein forward manipulation of said first pedal causes attendant tilting movement of said rearward rotor unit toward the port region of the fuselage and wherein forward manipulation of said second pedal causes attendant tilting movement of said rearward rotor unit toward the starboard region of the fuselage; and wherein manipulation of said aircraft control causes corresponding forward and rearward tilting movement of said rearward rotor unit with respect to said fuselage, wherein said control system is operable to tilt said forward and rearward non-powered rotor units in any selected azimuth reactive to said fuselage.

20. The autogiro of claim 19 wherein said conventional rotary wing aircraft control system includes a trim control stick mounted within said fuselage.

21. The autogiro of claim 19 wherein the forward rotor unit is mounted on the fuselage forward of the rearward rotor unit and wherein the forward rotor unit is positioned generally in a plane vertically above a plane of the rearward rotor unit.

* * * * *